(12) United States Patent
Mori et al.

(10) Patent No.: US 11,901,129 B2
(45) Date of Patent: Feb. 13, 2024

(54) BUSBAR STRUCTURE FOR CAPACITOR

(71) Applicant: NICHICON CORPORATION, Kyoto (JP)

(72) Inventors: Takashi Mori, Kyoto (JP); Yasuyuki Murakami, Kyoto (JP)

(73) Assignee: NICHICON CORPORATION, Kyoto (JP)

(*) Notice: Subject to any disclaimer, the term of this patent is extended or adjusted under 35 U.S.C. 154(b) by 59 days.

(21) Appl. No.: 17/784,741

(22) PCT Filed: Mar. 11, 2021

(86) PCT No.: PCT/JP2021/009807
§ 371 (c)(1),
(2) Date: Jun. 13, 2022

(87) PCT Pub. No.: WO2021/193105
PCT Pub. Date: Sep. 30, 2021

(65) Prior Publication Data
US 2023/0005668 A1 Jan. 5, 2023

(30) Foreign Application Priority Data

Mar. 24, 2020 (JP) ................. 2020-052977

(51) Int. Cl.
*H01G 4/228* (2006.01)
*H01G 4/224* (2006.01)
(Continued)

(52) U.S. Cl.
CPC ............. *H01G 4/228* (2013.01); *H01G 4/224* (2013.01); *H01G 4/32* (2013.01); *H01G 2/10* (2013.01)

(58) Field of Classification Search
None
See application file for complete search history.

(56) References Cited

U.S. PATENT DOCUMENTS 10,475,585 B2    11/2019   Sato et al.
2011/0149472 A1   6/2011   Yang et al.
(Continued)

FOREIGN PATENT DOCUMENTS

JP    2006-086438 A    3/2006
JP    2008-288242 A   11/2008
(Continued)

*Primary Examiner* — Eric W Thomas
(74) *Attorney, Agent, or Firm* — Norris McLaughlin, P.A.

(57) ABSTRACT

The insulating member is integrated with only one of the busbars by insert molding in which one of opposing plate members in either one of the busbars is used as an insert target. The insulating member includes an insulation active portion, a reinforcing portion and a connecting portion. The insulation active portion is disposed on a back-surface side of one of the opposing plate portions and is interposed between the back-surface side and the other one of the opposing plate portions. The reinforcing portion is disposed on the front-surface side of the one of the opposing plate portions. The connecting portion serves to connect the insulation active portion and the reinforcing portion into an integral unit. In the insulating member, lower end regions of the insulation active portion, reinforcing portion and connecting portion, which are close to the capacitor element and extending from an upper-surface side to a lower-surface side of a side plate portion, are embedded in a mold resin that covers the side plate portion.

9 Claims, 8 Drawing Sheets

(51) Int. Cl.
  *H01G 4/32*  (2006.01)
  *H01G 2/10*  (2006.01)

(56) References Cited

U.S. PATENT DOCUMENTS

2017/0338041 A1* 11/2017 Lei .......................... B60L 3/003
2019/0362898 A1* 11/2019 Hamerski ................ H01G 4/38

FOREIGN PATENT DOCUMENTS

| | | |
|---|---|---|
| JP | 2010-225970 A | 10/2010 |
| JP | 2010-251400 A | 11/2010 |
| JP | 2012-134338 A | 7/2012 |
| JP | 2016-152243 A | 8/2016 |
| WO | 2016/027462 A1 | 2/2016 |

* cited by examiner

BUSBAR STRUCTURE FOR CAPACITOR

TECHNICAL FIELD

The present invention relates to a busbar structure for use in a capacitor provided with: a capacitor element; a first busbar and a second busbar; an insulating member; and a mold resin, and is further characterized in that the first and second busbars each have a plate-like shape and are connected to the capacitor element at their base ends, the insulating member is interposed between the two busbars, the mold resin covers the whole capacitor element and covers the paired busbars in part inclusive of the base ends, and the insulating member is interposed between opposing plate portions of the respective busbars disposed against each other.

BACKGROUND ART

The two busbars respectively having P polarity (positive electrode) and N polarity (negative electrode) may include an electrically conductive, thin metal plate. To meet the demands for lower inductance and downsizing, opposing plate portions of these busbars may be often disposed in proximity against each other. A pair of P and N terminals for external connection on a free end side of the opposing plate portions may be mechanically and electrically joined to terminals for cable connection extended from an external electric device. Conventionally, an insulating member may be interposed between the opposing plate portions to ensure that these portions are certainly insulated from each other. On the other hand, an enough creepage distance should desirably be secured in order to avoid the occurrence of dielectric breakdown.

The terminals for external connection to be joined to the terminals for cable connection may be spaced away from the base ends of the busbars embedded in the mold resin and may be accordingly subject to a large moment under the action of an external force. What is more, the busbars are very thin, plate-like members.

The busbar including the electrically conductive, thin metal plate, may be likely to deform, for example, warp or bend, in a direction perpendicular to its plate surface.

A known technique for high precision in relative positioning of the paired busbars and the insulating member is to fit projections on front and back surfaces of the insulating member into holes of the opposing plate portions to fix the positions of these three members.

Known examples of the insulating member may include the insulating paper and the insulating sheet (patent documents 1 and 2). The patent documents 1 and 2 describe structural features that provide insulation between two busbars in which the insulating paper is wound around one of the two busbars having either polarity.

CITATION LIST

Patent Document

Patent document 1: JP 2008-288242 A (U.S. Pat. No. 4,946,618)
Patent document 2: JP 2010-225970 A (U.S. Pat. No. 5239989)

SUMMARY OF INVENTION

Technical Problem

The insulating paper or insulating sheet may be very thin and soft and are thus easily deformable and often difficult to handle. While an operator may have to use his/her hand and fingers to adhere the insulating paper (or sheet) to the plate portion along its circumference, this handwork may be very difficult to perform without accidentally shifting relative positions of the target members. The insulating paper (sheet), while being adhered to the plate portion, may be often mishandled, for example, easily creased, sagged, corrugated, distorted, displaced from its target position, or may lose parallelism in direction.

As a result of positional and dimensional inaccuracies and/or poor precision in relative positioning, the opposing plate portions may fail to have a predetermined creeping distance therebetween, which may invite the risk of insulation failure, or desirable low inductance may be simply impossible.

To meet the demands for high precision in relative positioning and positional and dimensional accuracies, careful handling with an expertise may be required, which, however, may raise certain issues related to the work efficiency and production cost.

There may be other issues to be addressed; the very thin and soft insulating paper (sheet) may hardly retain its original shape or increase the resistance to stress of the components disposed in proximity including the opposing plate portions. The components disposed in proximity, therefore, may be likely to deteriorate and deform after continued use over time, possibly inviting the risk of breakdown of the capacitor.

The present invention was accomplished to address these issues of the known art and is directed to, by pursuing higher precision in relative positioning and higher positional and dimensional accuracies of the opposing plate portions and the insulating member, provide the components disposed in proximity with higher resistance to stress and is also directed to achieving improved productivity and lower production cost.

Technical Solution

To this end, the present invention provides the following technical features.

A busbar structure for use in a capacitor,
the busbar structure comprising:
a capacitor element comprising, at axial ends on both sides thereof, electrodes disposed in a pair and having different polarities;
a first busbar and a second busbar each having a plate-like shape, the first and second busbars respectively comprising a base end portion, a side plate portion, an opposing plate portion, and terminals for external connection,
the base end portion being connectable to the electrode of the capacitor element, the side plate portion extending from the base end portion and being disposed along the side surface of the capacitor element, the opposing plate portion extending upward from the side plate portion, the terminals for external connection extending from the opposing plate portion;
an insulating member interposed between the opposing plate portions of the first and second busbars in a manner that the opposing plate portions are disposed in proximity against each other; and
a mold resin that covers all of the capacitor element and the base end portions and the side plate portions of the first and second busbars,
the insulating member being integral only with one of the first or second busbars by insert molding in which one of the opposing plate portions of the first or second busbar is used as an insert target and filled with a resin material which is a source material of the insulating member, the resin material of the insert molding being poured to run toward a back-surface side from a front-surface side of the one opposing plate portion, the front-surface side not facing the other one of the opposing plate portions of the first or second busbar so as to entirely enclose the one opposing plate portion, the terminal for external connection extending from the one of the opposing plate portions being extended in manner that protrudes upward from an end of the insulating member, a surface of the other one of the opposing plate portions facing the one of the opposing plate portions being allowed to contact the insulating member on the back-surface side.

The technical features described herein according to the present invention may provide the following technical effects.

The insulating member made of a mold resin may be superior in hardness and shape retainability to the insulating paper or sheet and may be thus difficult to deform. The insert molding, instead of handwork, is used to integrate the insulating member with one of the opposing plate portions in the first or second busbar. This may promise desirably high precision in relative positioning and positional and dimensional accuracies of the opposing plate portions and the insulating member.

By thus allowing the insulating member to contact the surface of one of the opposing plate portions facing the other of the opposing plate portions, whether the insulating member is experiencing loss of the filling resin and/or have any resin-missing voids may be easily checked before any contact is made between the components to be assembled.

The insulating member containing a resin as its source material may excel in shape retainability, which may improve handleability of the insulating member and one of the opposing plate portions that are integrally formed. Further advantageously, the insert molding may offer remarkably higher productivity than an operator's handwork and may accordingly allow lower production cost. In addition to that, unfavorable events that are often associated with the insulating paper (sheet) may certainly be avoidable, for example, creasing, sagging, corrugation, distortion, and displacement.

The present invention may include, other than the aspects described thus far, other various aspects and modified examples. The busbar structure for use in the capacitor described herein may be configured as described below.

1] According to an aspect, the insulating member may include an insulation active portion, a reinforcing portion, and a connecting portion. The insulation active portion is disposed on the back-surface side of the one of the opposing plate portions and is interposed between the back-surface side and the other one of the opposing plate portions. The reinforcing portion is disposed on the front-surface side of the one of the opposing plate portions. The connecting portion connects the insulation active portion and the reinforcing portion into an integral unit. In the insulating member, lower end regions of the insulation active portion, the reinforcing portion and the connecting portion that are close to the capacitor element is embedded in the mold resin.

According to this configuration, the reinforcing portion on the front-surface side of the plate portions is integral with and continuous to the insulation active portion on the back-surface side with the connecting portion being interposed therebetween, and the connecting portion in part connects the insulation active portion and the reinforcing portion to each other. Further, the lower end regions of the insulation active portion, reinforcing portion and connecting portion are embedded in the mold resin that covers the base ends and the side plate portions of the two busbars. This may promise desirably high precision in, as well as positioning of the opposing plate portions per se, positioning of the opposing plate portions and the insulating member, and may further provide a sufficient fixing strength at roots of the opposing plate portions. The busbar structure thus characterized may greatly improve the resistance to stress of the components disposed in proximity and may successfully prevent the risk that the components disposed in proximity deteriorate and deform after continued use over time and possibly invite the risk of breakdown of the capacitor.

2] The connecting portion may cover an upper edge, edges on lateral sides, and a bent portion of the one of the opposing plate portions, the bent portion being continuous from the one of the opposing plate portions to the side plate portion. This structural feature may assure a sufficient strength of the whole insulating member including the insulation active portion, reinforcing portion and connecting portion.

3] The connecting portion may be supported by allowing a bottom surface thereof to contact the upper surface of the capacitor element. The positions and postures of the opposing plate portions may be further stabilized by thus having the connecting portion of the insulating member supported by the upper surface of the capacitor element.

4] The connecting portion may include a horizontal support that supports a lower surface of the side plate portion in the other one of the first and second busbars. This may conduce to better stability of the position and posture of the other busbar.

5] The connecting portion may include an engaging member that controls relative displacement of the other one of the opposing plate portions. This may also conduce to better stability in the position and posture of the other busbar.

Advantageous Effects

The present invention may provide the following advantages important for low inductance; facilitated checkup of possible loss of the filling resin and/or any resin-missing voids, improved reliability in relative positioning and positional and dimensional accuracies of the opposing plate portions and the insulating member, and improved resistance to stress of the components disposed in proximity. Further, the present invention may successfully offer improved productivity and lower production cost.

DESCRIPTION OF EMBODIMENTS

Figure 1:
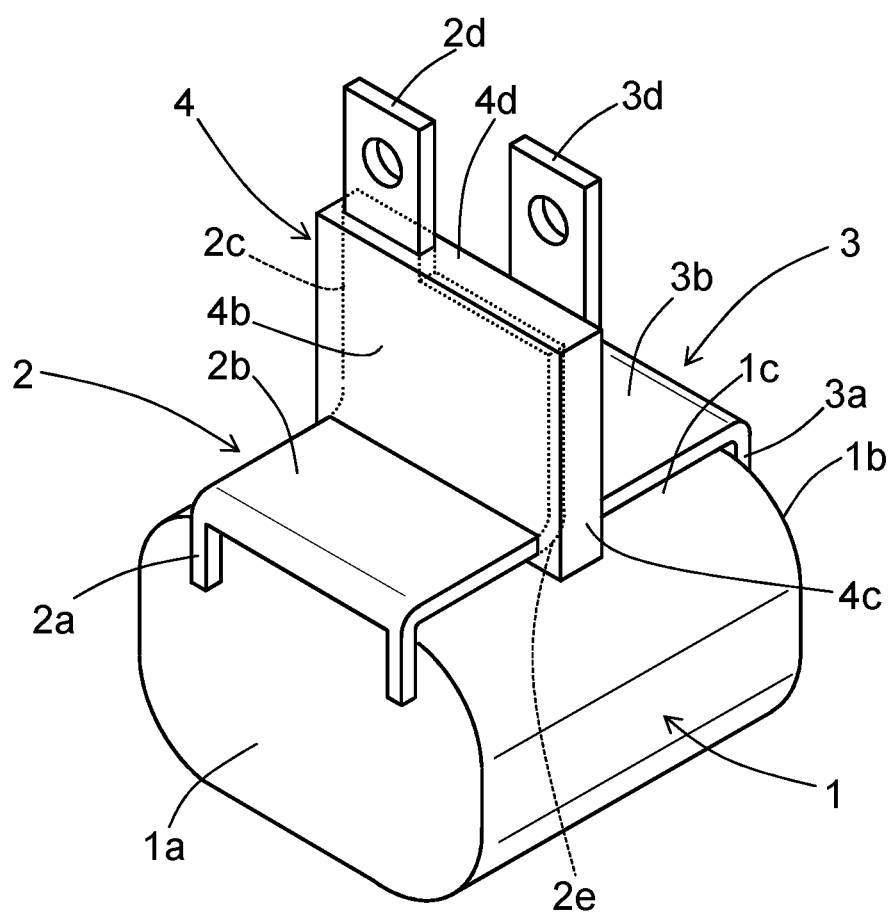
FIG. 1 is a perspective view of principal structural components of a capacitor according to an example of the present invention.
Figure 2:
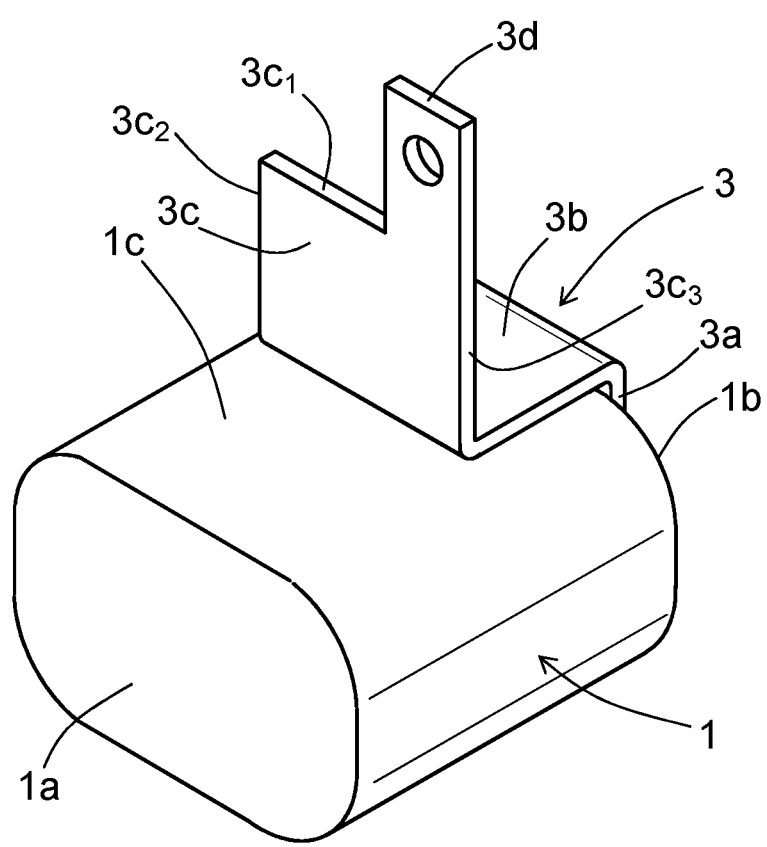
FIG. 2 is a perspective view of a capacitor element and a second busbar according to the example.
Figure 3:
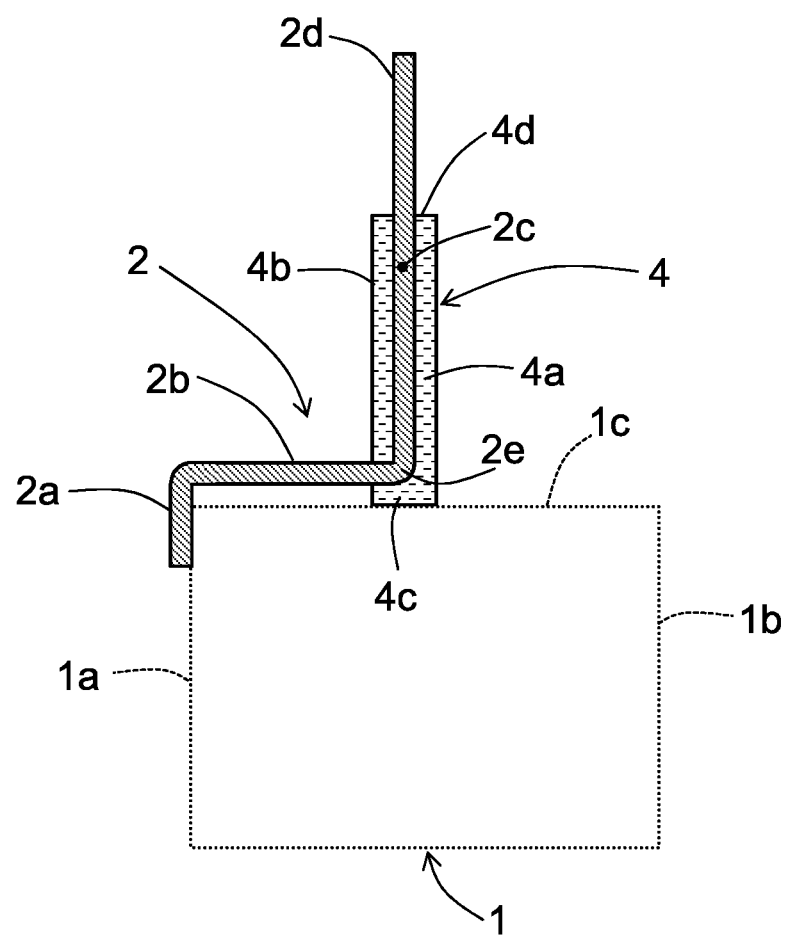
FIG. 3 is a side cross-sectional view of a first busbar with an insulating member being attached thereto according to the example.
Figure 4A:
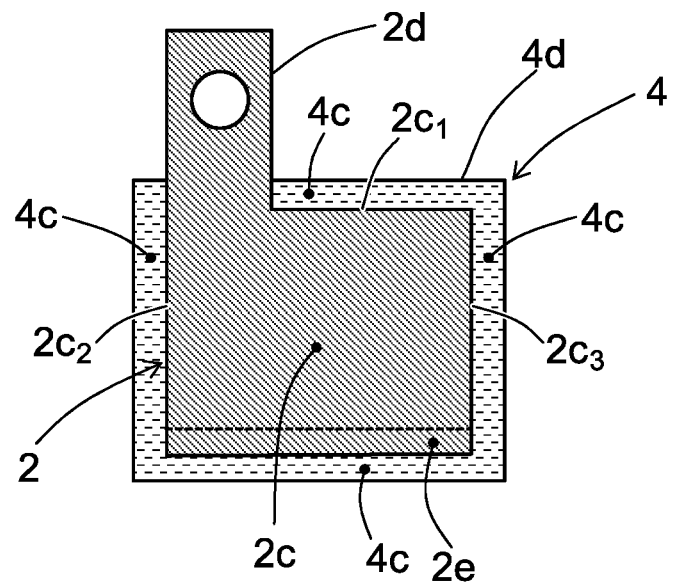
FIG. 4a is a front cross-sectional view of the insulating member-attached first busbar according to the example.
Figure 4B:
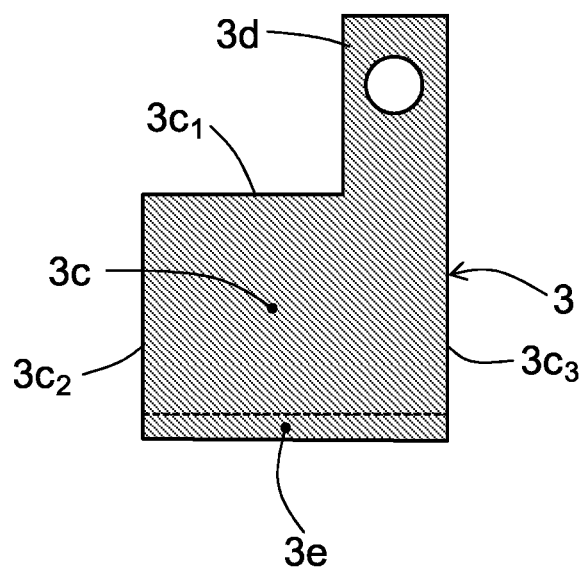
FIG. 4b is a front cross-sectional view of a second busbar with an insulating member being attached thereto according to the example.
Figure 5:
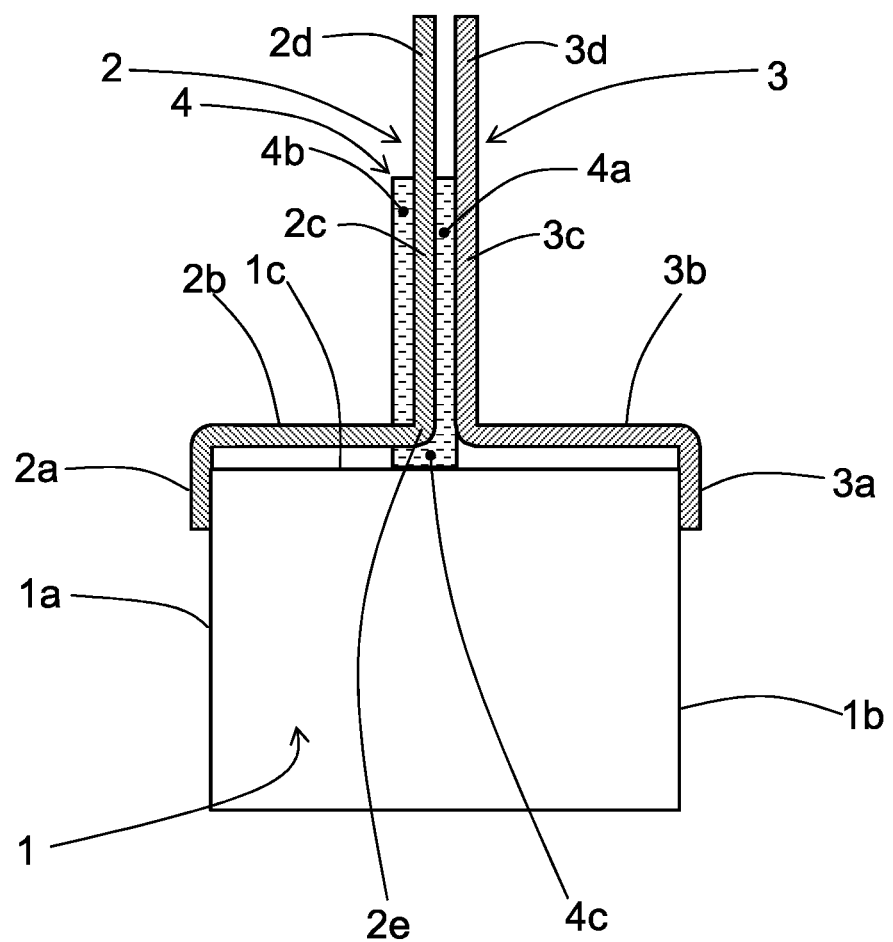
FIG. 5 is a side cross-sectional view of an assembly (of structural components) according to the example.
Figure 6:
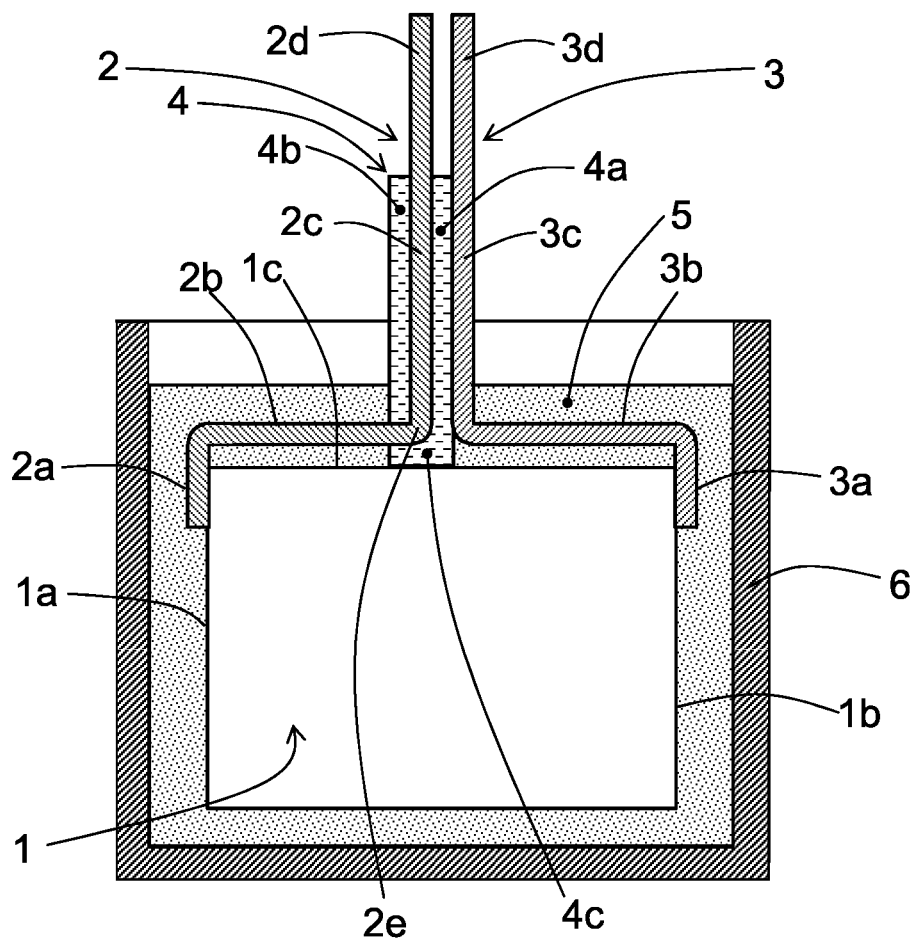
FIG. 6 is a side cross-sectional view of the capacitor according to the example.

The busbar structure for use in the capacitor described herein are more specifically described below based on different embodiments of the present invention.

In FIGS. 1 to 6 are illustrated a capacitor element 1, a first busbar 2, a second busbar 3, an insulating member 4, a mold resin 5, and an exterior case 6. The capacitor element 1 includes a pair of electrodes 1a and 1b having different polarities. The first and second busbars 2 and 3 respectively have side plate portions 2b and 3b, protruding pieces 2a and 3a for connecting purpose, opposing plate portions 2c and 3c, and terminals for external connection 2d and 3d. The insulating member 4 includes an insulation active portion 4a, a reinforcing portion 4b, and a connecting portion 4c.

The capacitor element 1 primarily consisting of a metalized film has, at its axial ends on both sides, a pair of electrodes having different polarities. The first and second busbars 2 and 3 each including a thin plate-shaped electric conductor are electrically and mechanically connected to the capacitor element 1. The first busbar 2 has protruding pieces 2a for connecting purpose, a side plate portion 2b, an opposing plate portions 2c, and a terminal 2d for external connection. The second busbar 3 has protruding pieces 3a for connecting purpose, a side plate portion 3b, an opposing plate portion 3c, and a terminal 3d for external connection. The side plate portions 2b and 3b of the first and second busbars 2 and 3 are disposed along an upper side surface 1c of the capacitor element 1. The side plate portion 2b and 3b are preferably disposed horizontally parallel to the upper side surface 1c of the capacitor element 1 (in the horizontal direction). The protruding pieces 2a and 3a for connecting purpose are bent at edges of the side plate portions 2b and 3b and are extending vertically downward from the edges. These protruding pieces 2a and 3a are connected by soldering to the paired electrodes 1a and 1b of the capacitor element 1 that differ in polarity. In both of the busbars 2 and 3, the opposing plate portions 2c and 3c are bent and extending vertically upward from the side plate portions 2b and 3b, and the terminals 2d and 3d for external connection are extending upward from upper edges $2c_1$ and $3c_1$ of the opposing plate portions 2c and 3c. The first and second busbars 2 and 3 are symmetric in shape to each other except positions of the terminals for external connection 2d and 3d.

The side plate portions 2b and 3b disposed in proximity along the upper surface 1c of the capacitor element 1 are both bent upward from positions at the axial center of the capacitor element 1, constituting the paired opposing plate portions 2c and 3c. The opposing plate portions 2c and 3c are disposed in proximity against and in parallel to each other. The insulation active portion 4a of the insulating member 4 is interposed between the opposing plate portions 2c and 3c.

The insulating member 4 includes, in addition to the insulation active portion 4a, the reinforcing portion 4b and the connection portion 4c that are continuous to each other and to the insulation active portion 4a. These three portions thus continuous to one another allow the insulating member 4 to be integral with the first busbar (first plate portion 2c).

The insulating member 4 is integrated with the first busbar 2 by insert molding in which the plate portion 2c of the first busbar 2 is used as an insert target and filled with a resin material which is a source material of the insulating member 4. The process to form the insulating member 4 is specifically described below.

After the plate portion 2c of the first busbar 2 is set in the cavity of a metal die of an inject molding equipment, the metal die is closed. A resin material is then injected into the cavity and poured around the insert target; plate portion 2c. The resin material is poured to run toward a back-surface side from a front-surface side of the plate portion 2c (not facing the plate portion 3c of the second busbar 3) and to a lower-surface side from an upper-surface side of the side plate portion 2b continuous to the plate portion 2c so as to enclose the whole plate portion 2c.

The insulating member 4 thus made of the resin material by insert molding is provided with the insulation active portion 4a, reinforcing portion 4b and connection portion 4c that are respectively characterized as follows. The insulation active portion 4a is located on the back-surface side of the first plate portion 2c and is interposed between the plate portions 2c and 3c. The reinforcing portion 4b is located on the front-surface side of the first plate portion 2c. The connecting portion 4c connects the insulation active portion 4a and the reinforcing portion 4b into an integral unit. The connecting portion 4c extends along the whole circumference at an edge of the first plate portion 2c.

The insulation active portion 4a of the insulating member 4 is in close contact with the back surface of the plate portion 2c, while the reinforcing portion 4b of the insulating member 4 is in close contact with the front surface of the plate portion 2c. The connecting portion 4c that interconnects the insulation active portion 4a and the reinforcing portion 4b covers an upper edge $2c_1$ and lateral edges on both sides $2c_2$ and $2c_3$ of the plate portion 2c and also covers a bent portion 2e continuous from the plate portion 2c to the side plate portion 2b.

In the plate portion 2c of the first busbar 2, substantially the whole plate portion 2c, inclusive of a base end part of the terminal for external connection 2d and a part continuous to the side plate portion 2b, are thus enclosed by the insulating member 4 having the insulation active portion 4a, reinforcing portion 4b and connection portion 4c. The insulating member 4, which is obtained by curing the resin material using the technique of insert molding, may excel in strength and shape retainability beyond comparison to the insulating paper or sheet of the known art. The insulating member 4 is closely adhered to and integral with the whole outer circumferential surface of the plate portion 2c under a great bonding strength.

The terminal for external connection 2d extending from the upper edge $2c_1$ of the first plate portion 2c is protruding upward from an upper surface 4d of the insulating member 4.

In the second busbar 3; one of the two busbars, a side surface (plate surface) of the plate portion 3c is in contact with a side surface (plate surface) of the insulation active portion 4a of the insulating member 4.

In the capacitor element 2, the insulating member 4 is thus integral with the first busbar 2 alone, without any contact with the second busbar 3. When such elements are mounted to the capacitor element 1, the side plate portion 2b of the first busbar 2 integral with the insulating member 4 is disposed on the upper surface 1c of the capacitor element 1, and the protruding pieces 2a for connecting purpose are then soldered to the electrode 1a of the capacitor element 1. Then, the side plate portion 2b of the second busbar 3 is disposed on the upper surface 1c of the capacitor element 1, and a surface (plate surface) of the plate portion 3c of this busbar is brought into close contact with a surface (plate surface) of the insulation active portion 4a integral with the first plate portion 2c. During this process, whether the insulation active portion 4a have any defects that possibly lead to insulation failure may be easily detectable, for example, whether there is loss of the filling resin and/or resin-missing voids. Then, the protruding pieces 3a for connecting purpose are soldered to the electrode 1b of the capacitor element 1.

The assembly of three elements; capacitor element 1, second busbar 3 and insulating member-attached first busbar 2, is housed in the exterior case 6 and molded with the mold resin 5. At the time, the mold resin 5 is poured into the case so as to cover the whole capacitor element 1 and all of the protruding pieces 2a and 3a and the side plate portions 2b and 3b of the two busbars 2 and 3. In the insulation active portion 4a, reinforcing portion 4b and connecting portion 4c of the insulating member 4 integrated with the first busbar 2, lower end regions of these portions, which are close to the capacitor element 1 and are extending from the upper-surface side to the lower-surface side of the side plate portion 2b, are embedded in the mold resin 5.

In the busbar structure of the capacitor thus structured, the insulating member 4 is three-dimensionally formed, in which three elements are integral with and continuous to one another; insulation active portion 4a, reinforcing portion 4b and connecting portion 4c. This insulating member 4 is closely contacting and enclosing the whole outer circumferential surface of the plate portion 2c of the first busbar 2. The connecting portion 4c covers the upper edge $2c_1$ and the lateral edges $2c_2$ and $2c_3$ on both sides and also covers the bent portion 2e continuous from the plate portion 2c to the side plate portion 2b. The connecting portion 4c in part extends from the upper-surface side to the lower-surface side of the side plate portion 2b and interconnects the insulation active portion 4a and the reinforcing portion 4b. This structural feature may impart a sufficiently large strength to the whole insulating member 4.

The bottom surface of the connecting portion 4c is in contact with and supported by the upper surface 1c of the capacitor element 1c. This may certainly conduce to better stability of the positions and postures of the plate portions 2c and 3c.

Further advantageously, the lower end regions, close to the capacitor element 1, of the insulation active region 4a, reinforcing portion 4b and connecting portion 4c are embedded in the mold resin covering the side plate portions 2b and 3b of the two busbars 2 and 3.

As a result of the synergetic effect of these structural advantages, a desirably high accuracy may be achievable at the time of deciding relative positions of the opposing plate portions 2c and 3c and the insulating member 4, as well as relative positions of the opposing plate portions 2c and 3c. In addition to that, a degree of strength at the time of anchoring roots of the opposing plate portions 2c and 3c may desirably be improved relative to the mold resin 5 covering the whole capacitor element 1. The busbar structure thus characterized may greatly improve the resistance to stress of the components disposed in proximity including the terminals for external connection 2d and 3d and the opposing plate portions 2c and 3c, and may successfully prevent the risk that the components disposed in proximity deteriorate and deform with time after continued use and possibly invite the risk of breakdown of the capacitor.

The insulating member 4 made of a cured mold resin may be superior in hardness and shape retainability to the insulating paper or insulating sheet of the known art. In assembling the structural elements, therefore, the insulating member 4 thus advantageous may be hardly creased, sagged, corrugated, distorted, or displaced from its target position. The three-dimensional insulating member 4 may be readily integrated by insert molding with the plate portion 2c of the first busbar 2 without an operator's handwork conventionally employed in the known art. This may allow desirably high precision to be achieved in relative positioning and positional and dimensional accuracies of the plate portion 2c and the insulating member 4 and may also lead to much improved productivity and resulting lower production cost.

Figure 7:
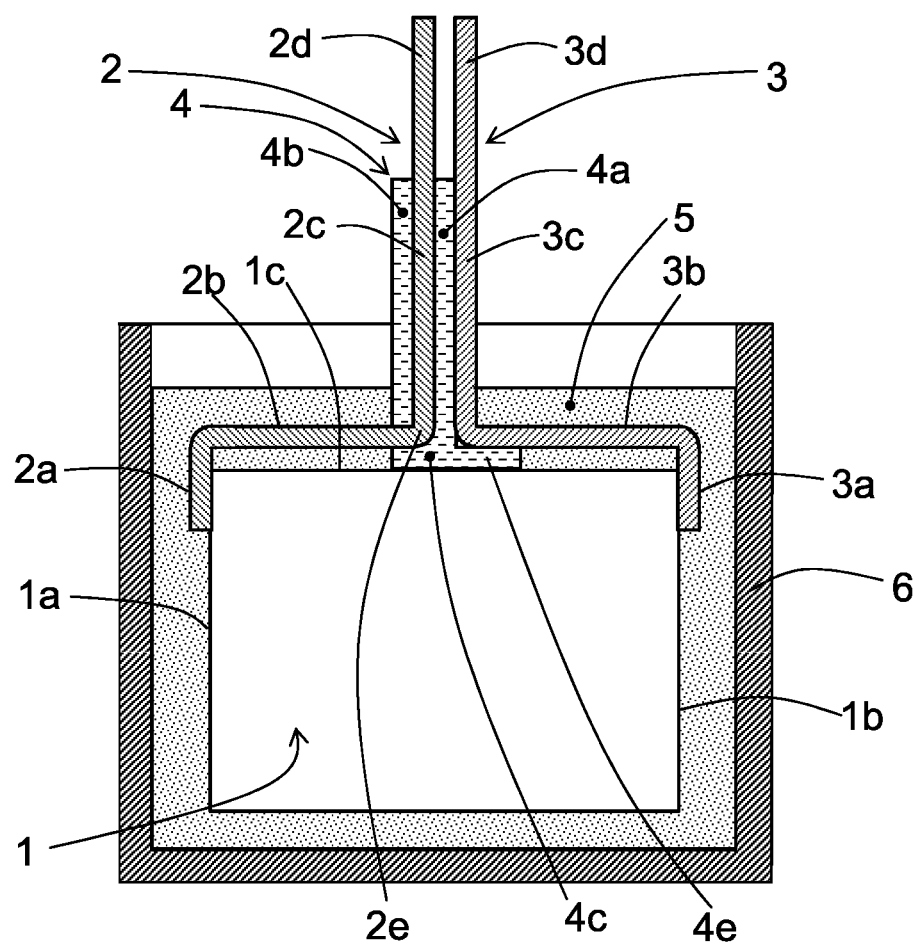
FIG. 7 is a side cross-sectional view of a capacitor according to another example of the present invention.

In an example illustrated in FIG. 7, a side surface supporter 4e is formed continuous to the connecting portion 4c of the insulating member 4. This side surface supporter 4e serves to support the whole lower surface of the side plate portion 3b of the second busbar 3. This example may provide better stability of the position and posture of the second busbar 3.

Figure 8:
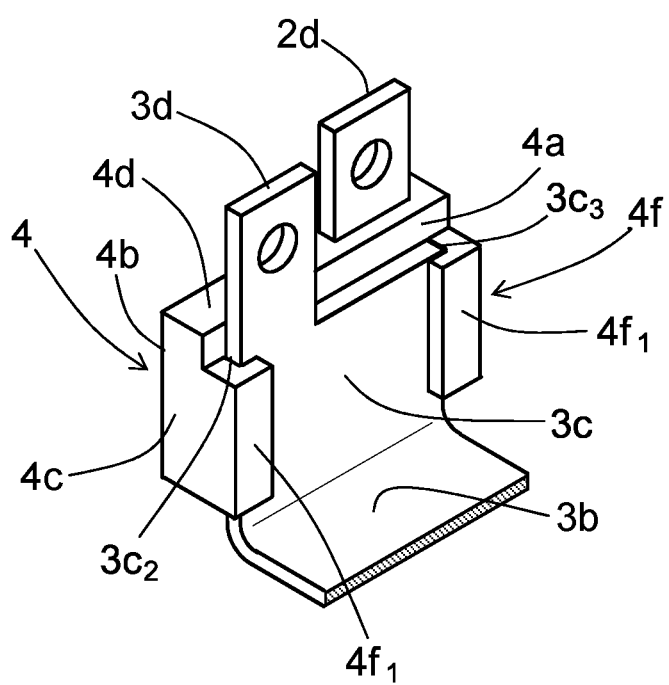
FIG. 8 is a perspective view of principal structural components, illustrating two opposing plate portions; a second plate portion, and a first plate portion with an insulating member being attached thereto.

In another example illustrated in FIG. 8, an engaging member 4f is formed continuous to the connecting portion 4c of the insulating member 4. The engaging member 4f serves to control relative displacement of the second plate portion 3c and includes a pair of rails $4f_1$. These paired rails are engageable with lateral edges $3c_2$ and $3c_3$ of the plate portion 3c of the second busbar 3 and thereby control any displacement away from the plate surface. This example may provide even better stability of the position and posture of the second busbar 3.

INDUSTRIAL APPLICABILITY

The present invention relates to a busbar structure for use in a capacitor and is directed to offering an advantageous technology that fulfills, for lower inductance, high precision in relative positioning and positional and dimensional accuracies of the opposing plate portions and the insulating member and thereby enhances the resistance to stress of the components disposed in proximity, and is also directed to offering improved productivity and lower production cost.

REFERENCE SIGNS LIST 1 capacitor element
1a, 1b electrode
1c upper surface of capacitor element
2 first busbar
3 second busbar
2a, 3a protruding piece (for connecting purpose) (at base end)
2b, 3b side plate portion
2c, 3c (first, second) plate portion (one of opposing plate portions)
$2c_1$ upper edge of plate portion
2d, 3d terminal for external connection
2e bent portion
4 insulating member
4a insulation active portion
4b reinforcing portion
4c connecting portion 4d upper surface
4e side surface supporter
4f engaging member
5 mold resin

The invention claimed is:

1. A busbar structure for use in a capacitor,
the busbar structure comprising:
a capacitor element comprising, at axial ends on both sides thereof, electrodes disposed in a pair and having different polarities;
a first busbar and a second busbar each having a plate-like shape, the first and second busbars respectively comprising a base end portion, a side plate portion, an opposing plate portion, and a terminal for external connection,
the base end portion being connectable to the electrodes of the capacitor element, the side plate portion extending from the base end portion and being disposed along the upper side surface of the capacitor element, the opposing plate portion extending upward from the side plate portion, the terminal for external connection extending from the opposing plate portion;
an insulating member interposed between the opposing plate portions of the first and second busbars in a manner that the opposing plate portions are disposed in proximity against each other; and
a mold resin that covers all of the capacitor element and the base end portions and the side plate portions of the first and second busbars,
the insulating member being integrated only with one of the first and second busbars by insert molding in which one of the opposing plate portions in the first or second busbar is used as an insert target and filled with a resin material which is a source material of the insulating member,
the resin material of the insert molding being poured to run toward a back-surface side from a front-surface side of the one of the opposing plate portions, the front-surface side not facing another one of the opposing plate portions of the first or second busbar so as to entirely enclose the one opposing plate portion,
the terminal for external connection extending from the one of the opposing plate portions being extended in manner that protrudes upward from an end of the insulating member,
a surface of the another one of the opposing plate portions facing the one of the opposing plate portions being allowed to contact the insulating member on the back-surface side.

2. The busbar structure for use in the capacitor according to claim 1, wherein
the insulating member comprises:
an insulation active portion;
a reinforcing portion; and
a connecting portion,
the insulation active portion being disposed on the back-surface side of the one of the opposing plate portions and interposed between the back-surface side and the another one of the opposing plate portions,
the reinforcing portion being disposed on the front-surface side of the one of the opposing plate portions,
the connecting portion serving to connect the insulation active portion and the reinforcing portion into an integral unit, and
lower end regions of the insulation active portion, the reinforcing portion and the connecting portion of the insulating member that are close to the capacitor element are embedded in the mold resin.

3. The busbar structure for use in the capacitor according to claim 2, wherein
the connecting portion covers an upper edge, edges on lateral sides, and a bent portion of the one of the opposing plate portions, the bent portion being continuous from the one of the opposing plate portions to the side plate portion.

4. The busbar structure for use in the capacitor according to claim 3, wherein
the connecting portion is supported by allowing a bottom surface thereof to contact the upper side surface of the capacitor element.

5. The busbar structure for use in the capacitor according to claim 3, wherein
the connecting portion comprises a horizontal support that supports a lower surface of the side plate portion in the another one of the first and second busbars.

6. The busbar structure for use in the capacitor according to claim 3, wherein
the connecting portion comprises an engaging member that controls relative displacement of the another one of the opposing plate portions.

7. The busbar structure for use in the capacitor according to claim 2, wherein
the connecting portion is supported by allowing a bottom surface thereof to contact the upper side surface of the capacitor element.

8. The busbar structure for use in the capacitor according to claim 2, wherein
the connecting portion comprises a horizontal support that supports a lower surface of the side plate portion in the another one of the first and second busbars.

9. The busbar structure for use in the capacitor according to claim 2, wherein
the connecting portion comprises an engaging member that controls relative displacement of the another one of the opposing plate portions.

* * * * *